(12) United States Patent
Elgee

(10) Patent No.: US 6,289,730 B1
(45) Date of Patent: *Sep. 18, 2001

(54) PAPER SIZE DETECTION USING ULTRASOUND

(75) Inventor: Steven B. Elgee, Portland, OR (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/695,371

(22) Filed: Oct. 24, 2000

Related U.S. Application Data

(63) Continuation of application No. 09/277,380, filed on Mar. 25, 1999, now Pat. No. 6,145,376.

(51) Int. Cl.[7] .............................. G01S 11/14; B65H 7/02
(52) U.S. Cl. ............................. 73/159; 73/597; 347/106; 271/9.06
(58) Field of Search ..................... 73/159, 597; 367/99; 271/9.06, 110, 111, 261; 347/106

(56) References Cited

U.S. PATENT DOCUMENTS

| | | | |
|---|---|---|---|
| 4,108,427 | 8/1978 | Komori et al. | 271/9 |
| 5,606,430 | 2/1997 | Morikawa et al. | 358/498 |
| 5,629,529 | * 5/1997 | Motoyama | 250/559.24 |
| 6,039,481 | 3/2000 | Ham | 400/708 |

* cited by examiner

*Primary Examiner*—John E. Chapman

(57) ABSTRACT

A detection system for detecting the size of a print medium. A hollow tube is positioned adjacent the paper or print medium. An ultrasonic transducer apparatus launches pulses of ultrasonic energy into the tube, and is responsive to ultrasonic echoes of the pulses to convert echo pulse energy into electrical detected signals. A flag positioning apparatus selectively positions a blocking flag within the tube at a location spaced from the transducer apparatus which is indicative of a print medium size. A controller responds to the electrical detected signals to determine a print medium size. The flag positioning apparatus can provide a single flag movable along a longitudinal extent of the tube, or a set of flags spaced along the longitudinal extent, one or more of which are selectably deflected by the print medium.

19 Claims, 9 Drawing Sheets

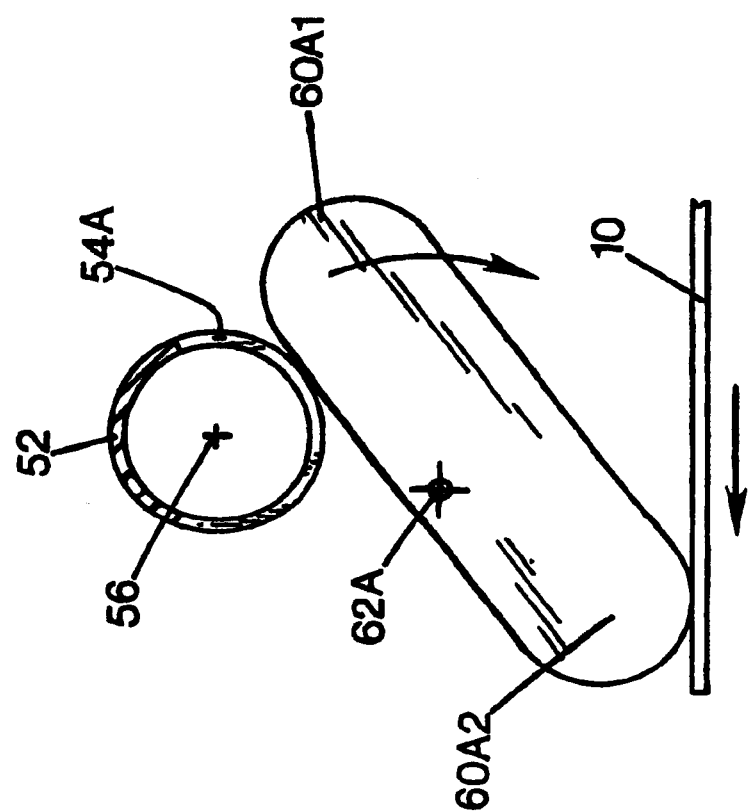
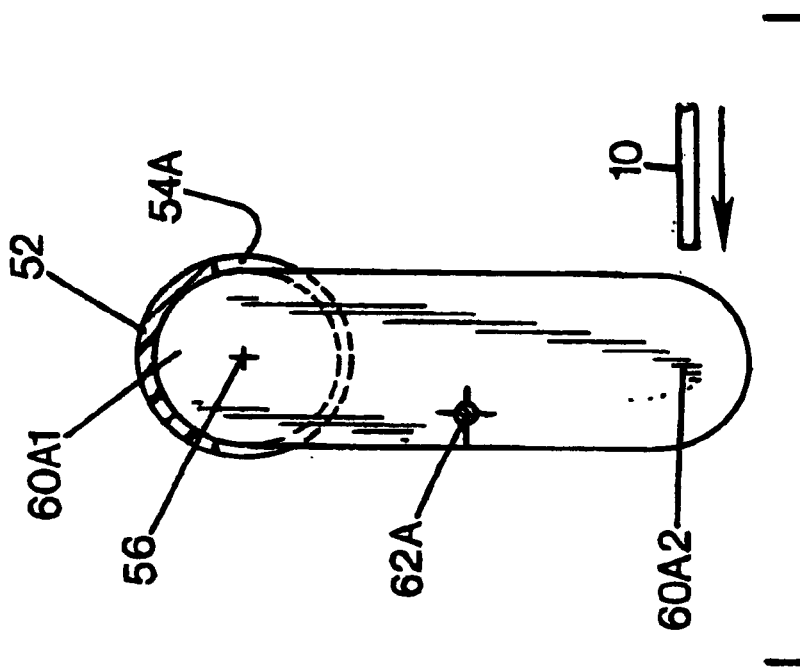

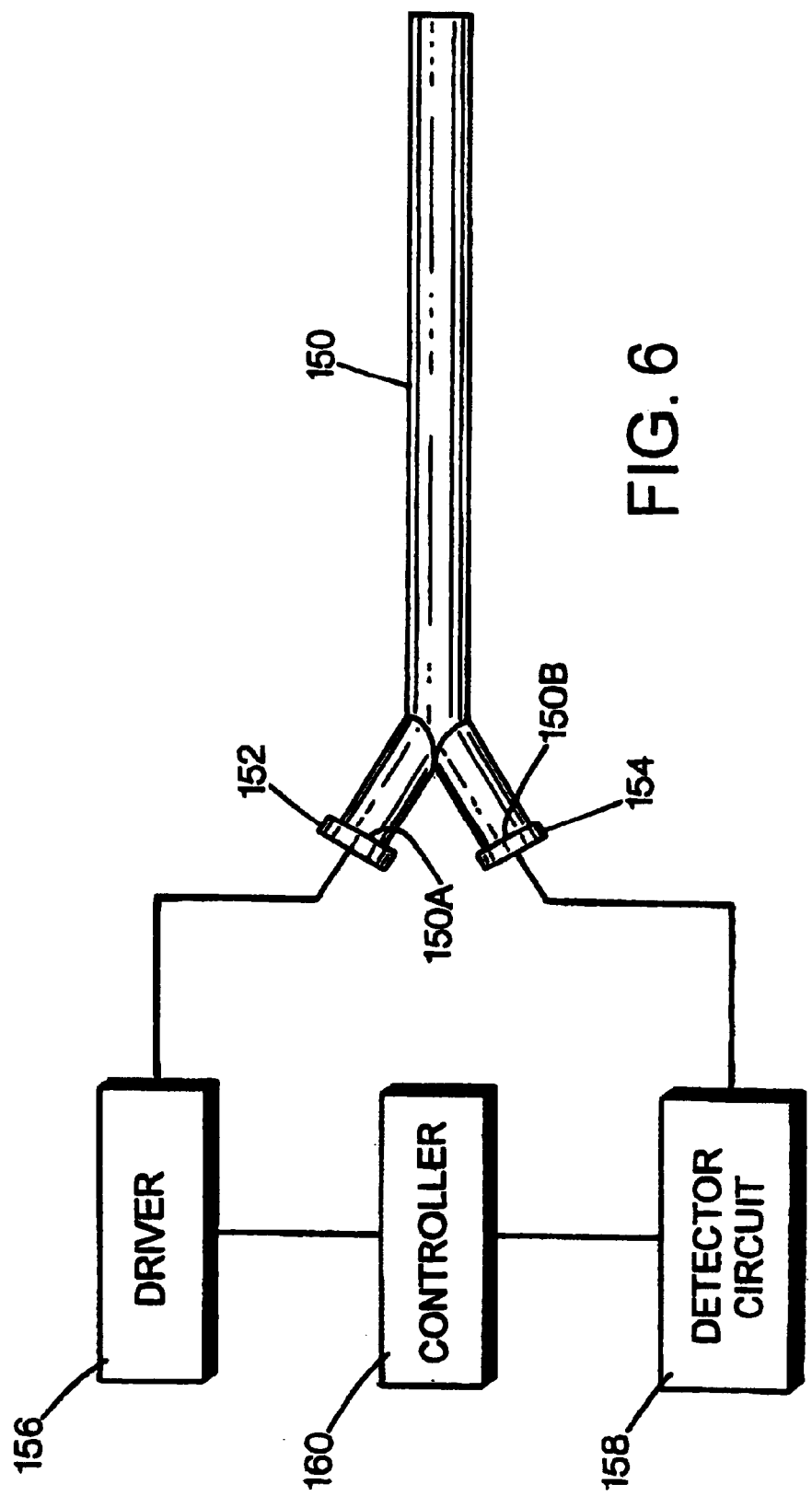

PAPER SIZE DETECTION USING ULTRASOUND

CROSS REFERENCE TO RELATED APPLICATION(S)

This is a continuation of application No. 09/277,380 filed on Mar. 25, 1999, now U.S. Pat. Ser. 6,145,376.

TECHNICAL FIELD OF THE INVENTION

This invention relates to paper handling systems, and more particularly to a technique for detecting the size of paper or other print media using ultrasound detection.

BACKGROUND OF THE INVENTION

Most printers such as ink-jet printers employ some type of sheet handling system for picking a sheet of print media such as paper from an input tray, advancing the picked sheet to a print area for printing operations, and delivering the sheet after printing to an exit location such as an output tray. The printers typically support printing on several media sizes, and may have more than one input tray or source. It therefore is useful in some applications to employ a media size detection system to detect the size of the paper or other print media that is being handled by the sheet handling device.

Some printers have used multiple reflective optical detectors located in the paper path to detect the size of the paper. This is expensive, particularly for more than two different paper sizes. Accordingly, it would be advantageous to provide a paper size detection technique which did not rely on optical detectors.

SUMMARY OF THE INVENTION

A detection system is disclosed for detecting the size of a print medium, and includes an apparatus for defining a hollow chamber. A drive signal generator is provided for generating pulses of electrical drive signals; in an exemplary embodiment, the drive signals are in an ultrasonic frequency range. The system further includes a transducer apparatus responsive to the electrical drive pulses for launching pulses of energy into the tube and responsive to echoes of the pulses to convert echo pulse energy into electrical detected signals. A flag positioning apparatus selectively positions a blocking flag within the tube at a location spaced from the transducer which is indicative of a print medium size. A controller is responsive to the electrical detected signals to determine a print medium size.

The apparatus for defining a hollow chamber can be a hollow tube. The flag positioning apparatus can provide a single flag movable along a longitudinal extent of the chamber, or a set of flags spaced along the longitudinal extent, one or more of which are selectably deflected by the print medium.

In accordance with another aspect of the invention, a method is disclosed for detecting the size of a print medium, comprising the steps of:

positioning an apparatus defining a hollow chamber adjacent the print medium;

positioning a blocking flag within the chamber at a location corresponding to a print medium size;

launching one or more pulses of ultrasonic energy into the chamber;

detecting the position of the blocking flag in the chamber by determining the time between the launching of the one or more pulses and the receipt of corresponding echoes of said one or more pulses at a transducer apparatus; and determining the print medium size in dependence on the detected position of said blocking flag.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2A illustrates a flag comprising the system of FIG. 1 in an upright, non-deflected position; FIG. 2B shows the flag in a deflected position.

FIG. 6 illustrates an alternate form of the tube and transducer arrangement for a detection system in accordance with the invention.

DETAILED DESCRIPTION OF THE PREFERRED EMBODIMENTS

Figure 1:
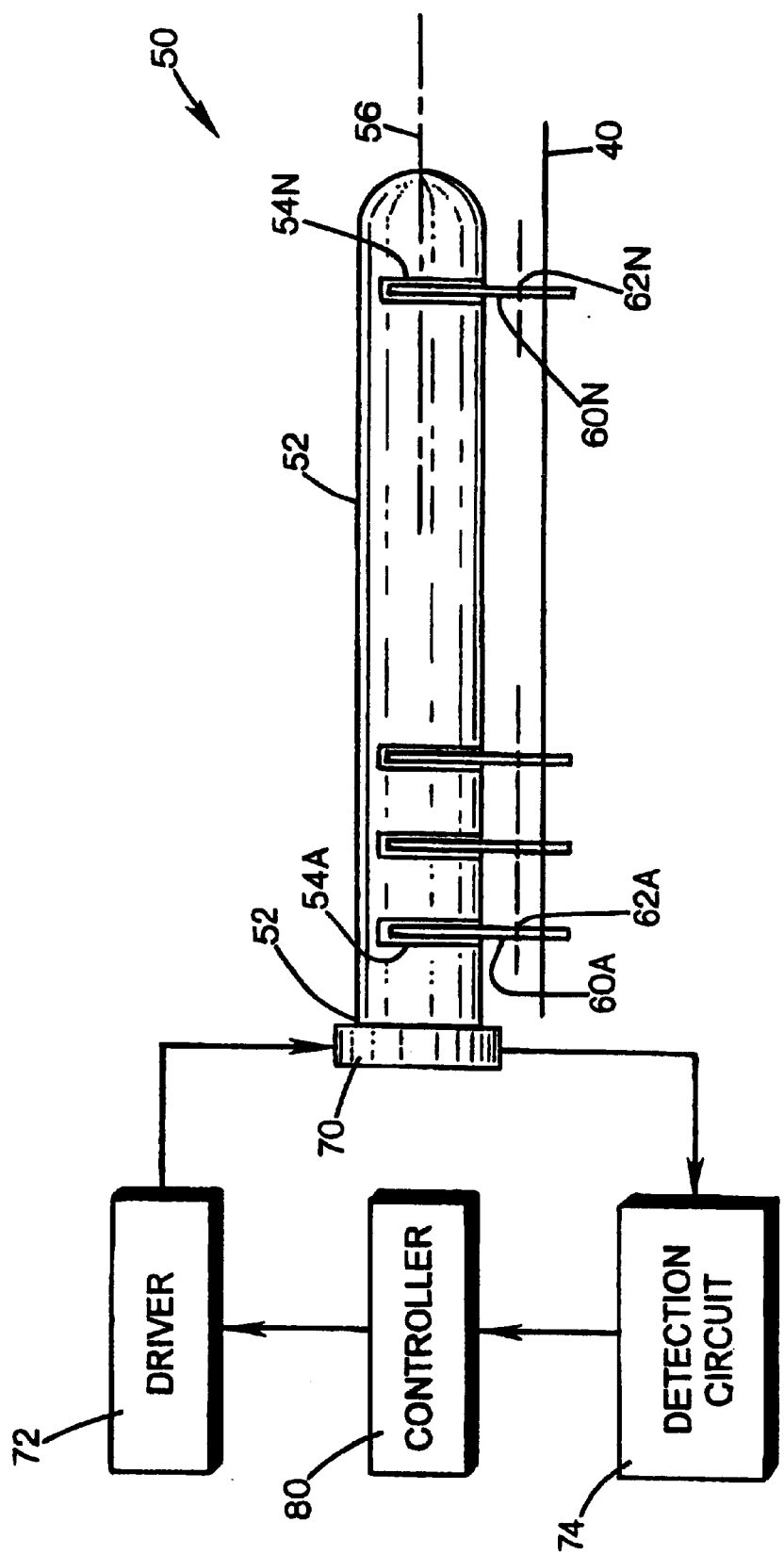
FIG. 1 is a simplified diagrammatic side view of a detection system in accordance with the invention.

A media size detection technique in accordance with this invention is illustrated in the simplified diagrammatic view of FIG. 1. The exemplary ultrasonic detection system 50 includes an apparatus 52 defining a hollow chamber, such as a hollow tube, disposed transverse to the media path indicated by line 40; the media path is into the plane of FIG. 1. The tube 52 can be above or below the paper but is shown in this exemplary embodiment as positioned above the paper. The tube 52 has a plurality of narrow slits 54A . . . 54N formed therein transverse to the longitudinal axis 56 of the tube, which extend from the bottom of the tube adjacent the paper path to near the top. The slits are formed along one side of the tube.

The system 50 further includes a plurality of pivoted flags 60A–60N which are mounted on respective pivots 62A–62N to move from respective upright positions wherein the flags are disposed into the tube through the respective slits, to respective deflected positions wherein a given flag is deflected by the medium and is positioned out of the tube.

FIG. 2A illustrates the normal position of exemplary flag 60A in the upright position, wherein the top portion 60A1 of the flag is disposed within and across the tube through the slit 54A, presenting a blocking wall across the tube. When a sheet of print media such as a sheet of paper is passed into the paper path below the tube 52, the leading edge of the medium will contact and deflect flags which are in the path of the leading edge. The deflected position of flag 60A is illustrated in FIG. 2B, where medium 10 has contacted the lower portion 60A2 of the flag, pivoting the flag about pivot 62A. In the deflected position, the top portion 60A1 of the flag is positioned out of the tube 52.

In this exemplary embodiment, the flags 60A–60N are spaced transversely across the media path 40, such that flag 60A is positioned adjacent the nominal position of the left edge of the medium. Thus, flag 60A will be contacted by a correctly loaded sheet when passed through the paper size detector. The remaining flags 60B . . . 60N are positioned along the tube, to provide coverage for the largest width of the print medium supported by the size detector system. Thus, when a sheet is passed through the size detector system, a certain number of the flags 60A–60N will be deflected out of the tube, depending on the width of the medium. For correctly loaded media, flag 60A will always be deflected, and all flags positioned in the path of the leading edge of the print medium will also be deflected.

In an exemplary printer application, the tube is positioned for detecting the size of print media located in the input tray of a printing device. This allows the printing device controller to detect the size of the print media in a given tray. For multiple input source/tray devices, each holding print media of a different size, the controller then knows which input source to pick the print media for a given print job. Thus, the media path 40 in FIGS. 1 and 2A–2B can represent a path in which the print media is carried when the input tray is loaded into the print machine, so that the flags are deflected by print media in the tray. Another alternative is to position the tube along the media path downstream of the input tray, between the input tray and the print zone.

An exemplary diameter of the tube is 10 mm, with slits having a width of 1.5 mm, a flag thickness of 1 mm, and a flag spacing of 5 mm. The flags can be spaced as closely together as practical, or placed at certain positions selected according to the expected media sizes supported by the apparatus such as a printing device with which the detector is used.

The system 50 further includes an ultrasonic transducer 70 positioned in an end 52A of the tube 52, an ultrasonic driver circuit 72 coupled to the transducer, a detection circuit 74 also coupled to the transducer, and a controller 80 for controlling the operation of the system. When a medium size detection measurement is to be performed, the controller 80 activates the driver 72 to generate an electrical drive pulse at an ultrasonic frequency. The transducer 70 can be a piezoelectric transducer, for example, and converts the electrical drive pulse into a pulse of ultrasonic energy launched into the tube 52. The pulse will be reflected by the closest of the flags 60A–60N which has not been deflected by the print medium 10. The transducer 70 responds to the reflected pulse of ultrasonic energy, i.e. the echo, by converting the reflected energy into an electrical transducer signal. The detection circuit 74 responds to the electrical transducer signal.

The controller 80 receives signals from the detection circuit indicative of the time of arrival of the reflected pulse at the transducer. By determining the time interval between the time of launching of the pulse into the tube and the time of reception of the reflected ultrasonic pulse, the distance from the transducer to the blocking flag can be determined. The controller relates this time to a measured medium width, based on the knowledge of which flag is not deflected.

If the echo is from flag 60A, this is an indication that the print medium 10 has not loaded correctly, and thus indicates a feed problem. This is useful for products that require the print medium to be justified to one side of the input tray. Echoes returned from respective flags 60B . . . 60N indicate the size of the medium.

Figure 3:
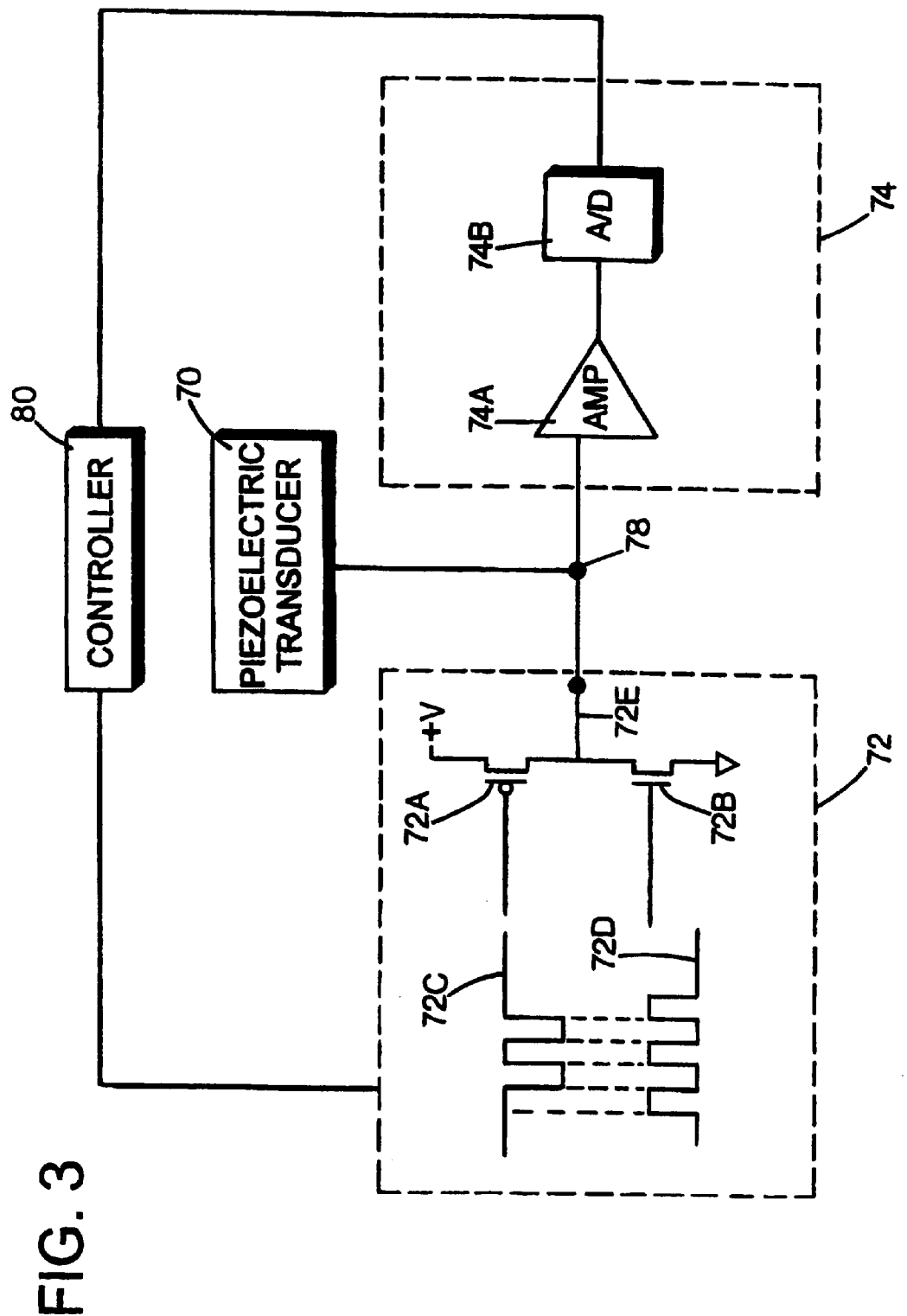
FIG. 3 is a simplified circuit schematic of the electrical elements of the system of FIG. 1.

FIG. 3 is a simplified schematic diagram showing one exemplary circuit for exciting the tube and responding to the reflected ultrasonic energy to determine the position of the closest flag to the transducer. In this embodiment, the drive 72 comprises a high bridge driver circuit, with a high output impedance. Such driver circuits are well known in the circuit arts. This driver circuit includes a pair of transistor switches 72A, 72B which are switched to conductive states by square wave pulse signals 72C, 72D of complimentary polarity. The switches are series connected between +V and ground potential. The preferred frequency of the square wave signals is ultrasonic, e.g. in a range between 40 Khz to 200 Khz.

Other excitation frequencies can also be used. Frequencies in the audible range may have some objectionable noise problems. Frequencies higher than 200 Khz could also be used, e.g. above 1 Mhz. The selection of the transducer type will depend on the frequency of operation. For applications using audible excitation signals, electromagnetic transducers such as speakers could be used. Electret microphones could be used as a receiver element. Other types of transducers could alternatively be employed.

The excitation signal produced by the driver 72 is coupled to node 78 between the transducer 70, the driver and the detector circuit 74. The detector circuit 74 includes an amplifier 74A for amplifying the input signal at node 78, and an analog-to-digital converter (ADC) 74B. The digitized output from the detector circuit 74 is provided to the controller 80.

The transducer 70 responds to the ultrasonic excitation pulses which are generated by the driver as well as to the echoes of the excitation pulses. The output of the ADC 74B is then, on a time-sampled basis, two digitized amplitudes, separated in time (T seconds) by the time needed for the excitation pulse to travel from the transducer down the tube to the flag, and to travel on the return path from the flag back to the transducer. With knowledge of the speed of propagation (S inch/sec) of the pulse within the tube, the determination of the distance of the flag from the transducer is equivalent to TS/2. The controller 80 can be a microprocessor which actuates the driver 72 to generate an ultrasonic pulse, and monitors the detector output to determine the value for T. The controller 80 can either perform the calculation to determine the location of the flag, or use the value T to locate a predetermined corresponding value stored in memory in a lookup table.

Figure 4:
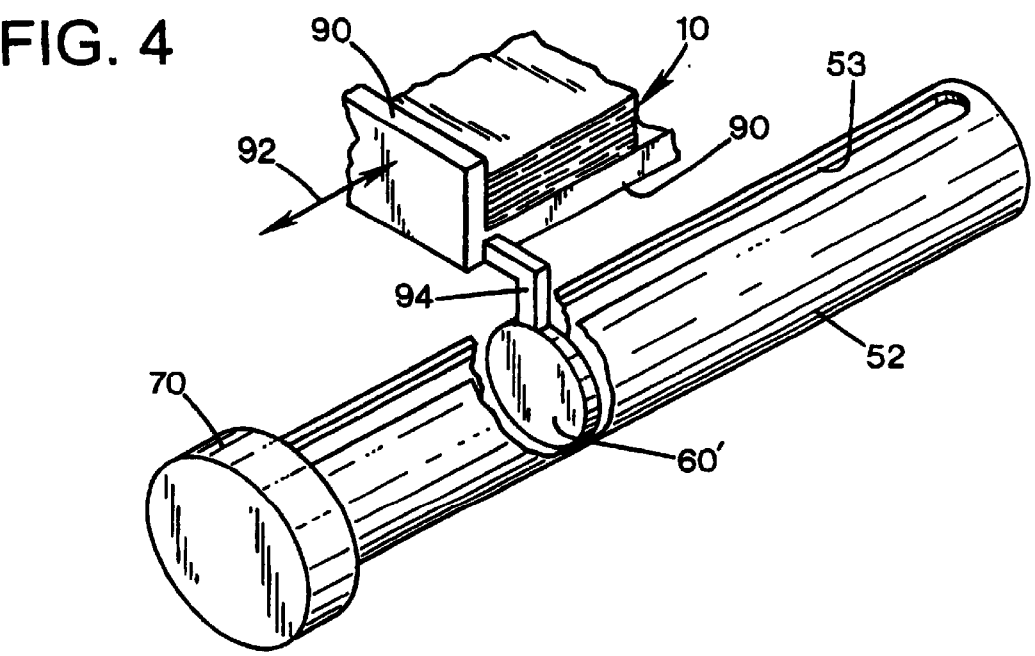
FIG. 4 illustrates an alternate flag/tube arrangement usable in a detection system in accordance with the invention.

The use of a set of spaced flags in a tube is only one embodiment of a media size detector in accordance with the invention. In another embodiment, a single flag can be supported in the tube for movement along the tube through a range of movement. The flag can be coupled to a movable media guide element on the media tray, for example, so that when the tray is set to hold a particular size or length of media by positioning the guide element to define a media guide, the flag is also positioned within the tube to a corresponding position. FIG. 4 illustrates such an embodiment. Here, the tube 52 has a slot 53 formed longitudinally along the top of the tube. The tube 52 is disposed in a printer below the tray structure 90 holding a stack of print media in sheet form. The structure 90 includes an upstanding wall 90, and is adjustable in position along arrow 92 to accommodate print media of varying width or length. The wall 90A can be positioned in either the width or length dimension, and some applications will employ two sensors, one for length, one for width. A link 94 is attached to the bottom of the tray structure, and extends through the slot 53. The link supports a flag 60' within the tube, so that, as the tray structure 90 is moved by the printer operator to adjust for the size of print media within the tray, the flag 60' also moves. The system includes a transducer 70 positioned at one end of the tube 52, and as well the driver 72, detection circuit 74 and controller 80 (not shown in FIG. 4) as in the embodiment of FIG. 1.

The embodiment of FIG. 4 is similar to the system of FIG. 1, except that a single flag is employed, and the longitudinal position of the flag is movable along the longitudinal extent of the tube in dependence on the position of the tray size adjustment feature. This embodiment thus indirectly provides an indication of the media size, through the position of the tray feature.

Figure 5A:
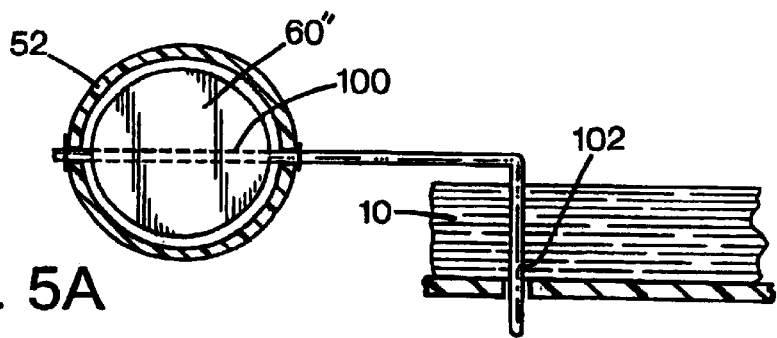
FIG. 5A shows a second alternate flag/tube arrangement for a detection system in accordance with the invention.
Figure 5B:
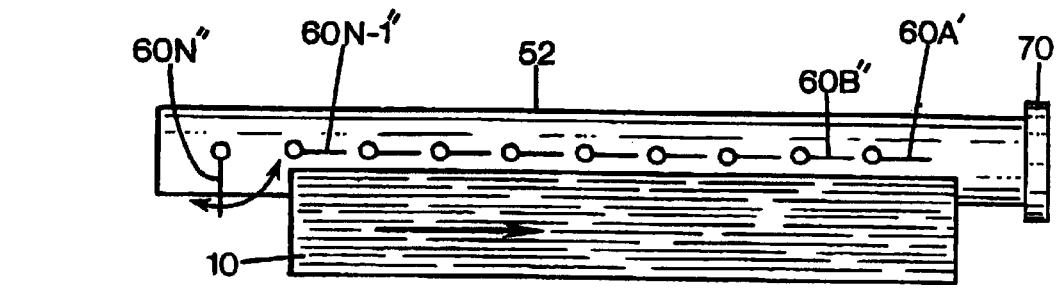
FIG. 5B is a diagrammatic depiction of a detection system employing the flag/tube arrangement of FIG. 5A.

Another alternate embodiment of the flag feature is illustrated in FIGS. 5A–5B. In this embodiment, the system employs a plurality of flags spaced along the longitudinal extent of the tube, as in the embodiment of FIG. 1. In this alternate embodiment, each flag is mounted within the tube for pivotal movement about a diametrical axis, in a manner analogous to a carburetor butterfly valve. Each flag is biased to return to a position closing the tube, but is deflectable about the pivot axis by a linkage contact with the print media. FIG. 5A is an end view illustrative of this type of tube/flag arrangement. The flag 60" is positioned in the tube on link 100 which extends through the tube. In FIG. 5A, the flag is shown in the normal, vertical position blocking the tube. Attached to the link 100 is a right angle deflector link 102. Depending on the placement of the flag 60" along the longitudinal extent of the tube, and the size of the media 10, the link 102 can be in a downward or undeflected position with the flag blocking the tube, or in a deflected position parallel to the plane of the medium.

FIG. 5B is a simplified schematic side view illustrating the tube and flag embodiment of FIG. 5A, used to measure the length of a stack of print media in an input tray. Here, the tube is oriented above the tray, along the longitudinal extent thereof. The transducer 70 is positioned in the tube at an end adjacent the leading edge of the print media, so that the sensor system detects the position of the trailing end of the print media. The flags 60A",60B" . . . will be deflected by the print media, except those past the trailing end of the medium. FIG. 5B shows the case where the medium 10 is of sufficient length to deflect all flags except flag 60N". The measurement will return an indication that the closest deflected flag is 60N",and the sensor employs this information to determine the length of the print medium.

The foregoing embodiments of a sensor system have employed a single transducer, used for both exciting the tube with the ultrasonic pulse and detecting the echo of the pulse. Separate transducers could alternatively be employed. FIG. 6 shows a sensor system employing a transmit transducer 152, and a receive transducer 154. The tube 150 has a Y-shaped end to provide a transmit port 150A and a receive port 150B. The transmit transducer 152 is positioned at the transmit port 150A, and the receive transducer 154 is positioned at the receive port 150B. The driver 156 is connected to the transducer 152, and the detector circuit 154 is connected to the receiver transducer 154, with the controller 160 controlling the operation of the driver, and receiving detected digitized signals from the detector circuit 158.

Figure 7:
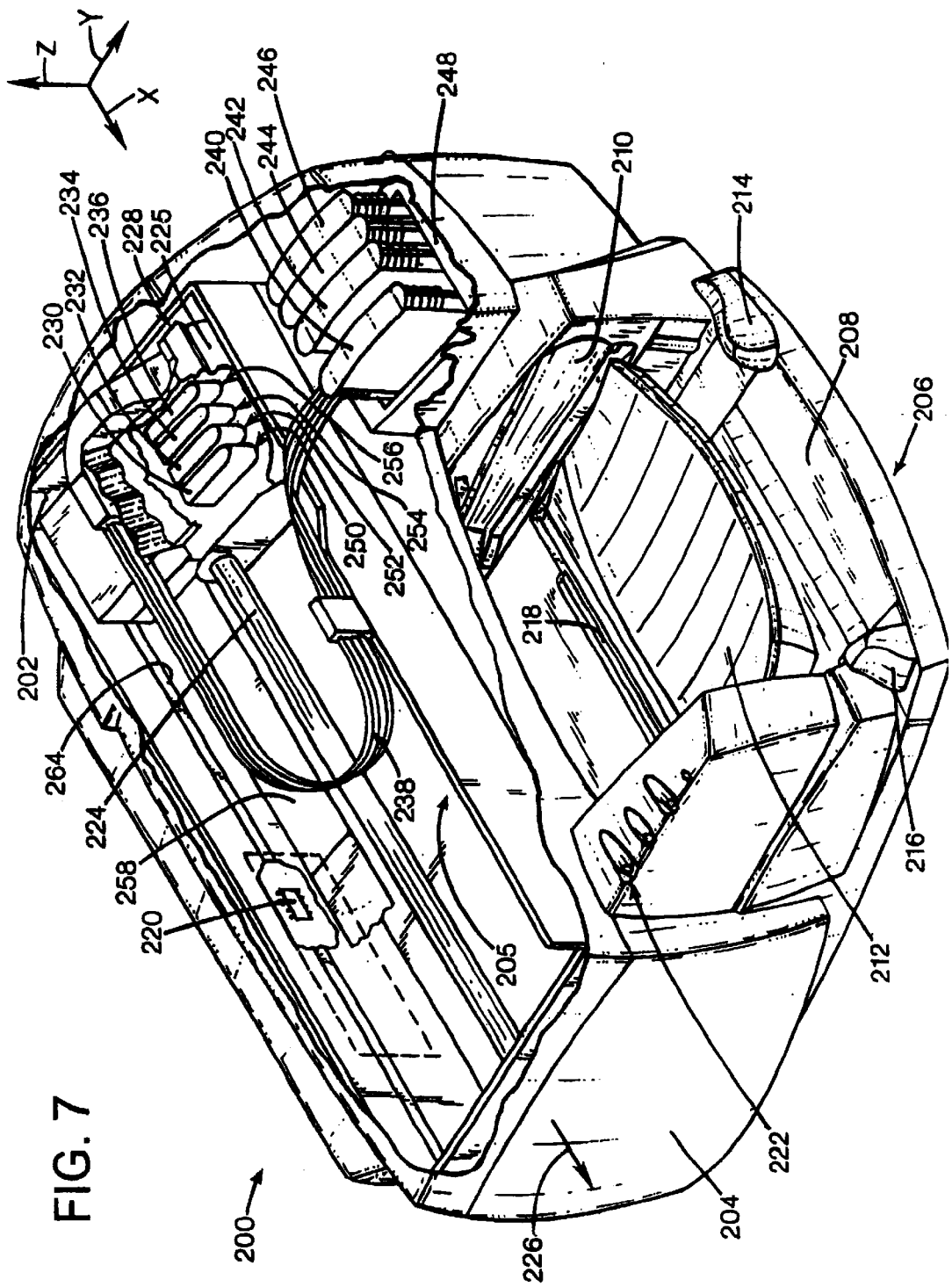
FIG. 7 is a front perspective view of a printing device that includes an embodiment of the present invention.

FIG. 7 illustrates an embodiment of an inkjet printing device 200, here shown as an "off-axis" inkjet printer, employing aspects the present invention, which may be used for printing business reports, correspondence, desktop publishing, and the like, in an industrial, office, home or other environment. A variety of inkjet printing devices are commercially available. For instance, some of the printing devices that may embody the present invention include plotters, portable printing units, copiers, cameras, video printers, and facsimile machines, to name a few, as well as various combination devices, such as a combination facsimile and printer. For convenience, aspects of the present invention are illustrated in the environment of inkjet printer 200.

While the printing device components may vary from model to model, the typical inkjet printer 200 includes a frame or chassis 202 surrounded by a housing, casing or enclosure 204, typically made of a plastic material. Sheets of print media are fed through a print zone 205 by a print media handling system 206. The print media may be any type of suitable material, such as paper, card-stock, transparencies, photographic paper, fabric, mylar, metalized media, and the like, but for convenience, the illustrated embodiment is described using paper as the print medium. Print media handling system 206 has an input supply feed tray 208 for storing sheets of print media before printing. A series of conventional print media drive rollers 276 (FIG. 8) driven by a direct current (dc) motor and drive gear assembly (not shown) may be used to move the print media from the feed tray 208, through the print zone 205, and, after printing, onto a pair of extended output drying wing members 210, shown in a retracted or rest position in FIG. 7. Wings 210 momentarily hold a newly printed sheet of print media above any previously printed sheets still drying in an output tray portion 212, then retract to the sides to drop the newly printed sheet into the output tray 212.

Media handling system 206 may include a series of adjustment mechanisms for accommodating different sizes of print media, including letter, legal, A-4, envelopes, etc., such as a sliding length adjustment lever 214, a sliding width adjustment lever 216, and an envelope feed port 218. Although not shown, it is to be understood that media handling system 26 may also include other items such as one or more additional print media feed trays. Additionally, media handling system 206 and printing device 200 may be configured to support specific printing tasks such as duplex printing and banner printing.

Printing device 200 also has a printer controller 220, illustrated schematically as a microprocessor, that receives instructions from a host device, typically a computer, such as a personal computer (not shown). Many of the printer controller functions may be performed by the host computer, including any printing device drivers resident on the host computer, by electronics on board the printer, or by interactions between the host computer and the electronics. The controller 220 can also perform the functions of the detector controller 80 (FIG. 1). As used herein, the term "printer controller 220" encompasses these functions, whether performed by the host computer, the printer, an intermediary device between the host computer and printer, or by combined interaction of such elements. Printer controller 220 may also operate in response to user inputs provided through a key pad 222 located on the exterior of the casing 204.

A carriage guide rod 224 is supported by chassis 202 to slidably support an off-axis inkjet pen carriage system 225 for travel back and forth across print zone 205 along a scanning axis 226. As can be seen in FIG. 7, scanning axis 226 is substantially parallel to the X-axis of the XYZ coordinate system shown in FIG. 7. Carriage 225 is also propelled along guide rod 224 into a servicing region, as indicated generally by arrow 228, located within the interior of housing 204. A conventional carriage drive gear and dc (direct current) motor assembly (both of which are not shown) may be coupled to drive an endless loop, which may be secured in a conventional manner to carriage 225, with the dc motor operating in response to control signals received from controller 220 to incrementally advance carriage 225 along guide rod 224 in response to rotation of the dc motor.

In print zone 205, the media sheet receives ink from an inkjet cartridge or pen, such as a black ink cartridge 230 and three monochrome color ink cartridges 232, 234 and 236. The pens each include a small reservoir for storing a supply of ink in what is known as an "off-axis" ink delivery system, which is in contrast to an "on-axis" replaceable ink cartridge system where each pen has a reservoir that carries the entire ink supply as the printhead reciprocates over print zone 205 along the scan axis 226. The present invention is operable in both off-axis and on-axis systems.

Ink of each color for each printhead is delivered via a conduit or tubing system 238 from a group of main ink reservoirs 230, 242, 244, and 246 to the on-board reservoirs of respective pens 230, 232, 234, and 236. Each pen has a respective printhead, as generally indicated by arrows 250, 252, 254, and 256, which selectively ejects ink to from an image on a sheet of media in print zone 205.

To provide carriage positional feedback information to printer controller 220, a conventional optical encoder strip 264 extends along the length of the print zone 205 and over the service station area 228, with a conventional optical encoder reader being mounted on a back surface of printhead carriage 225 to read positional information provided by encoder strip 264.

Figure 8:
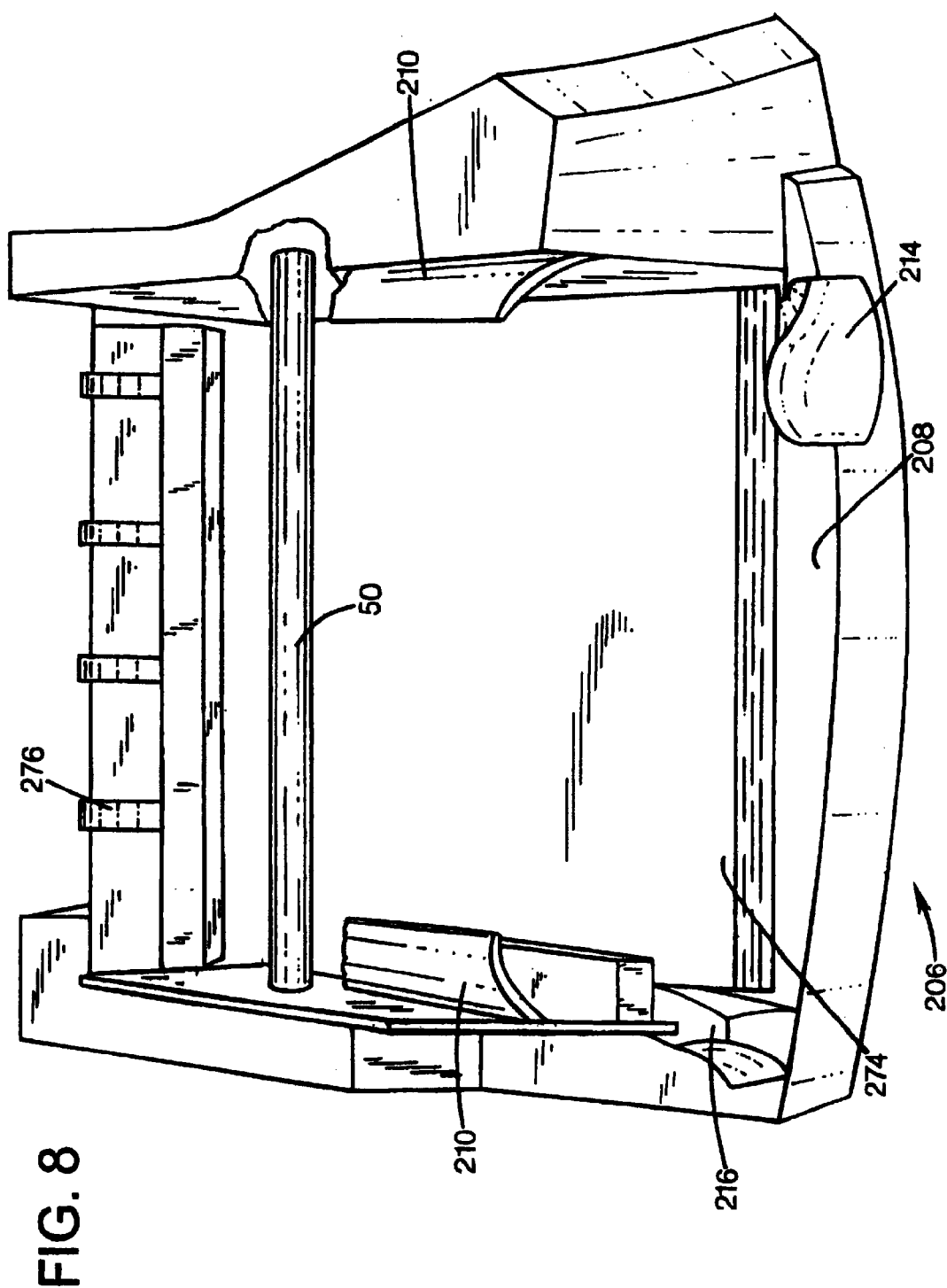
FIG. 8 is a front, top view of a print media handing system of the printing device shown in FIG. 7.
Figure 9:
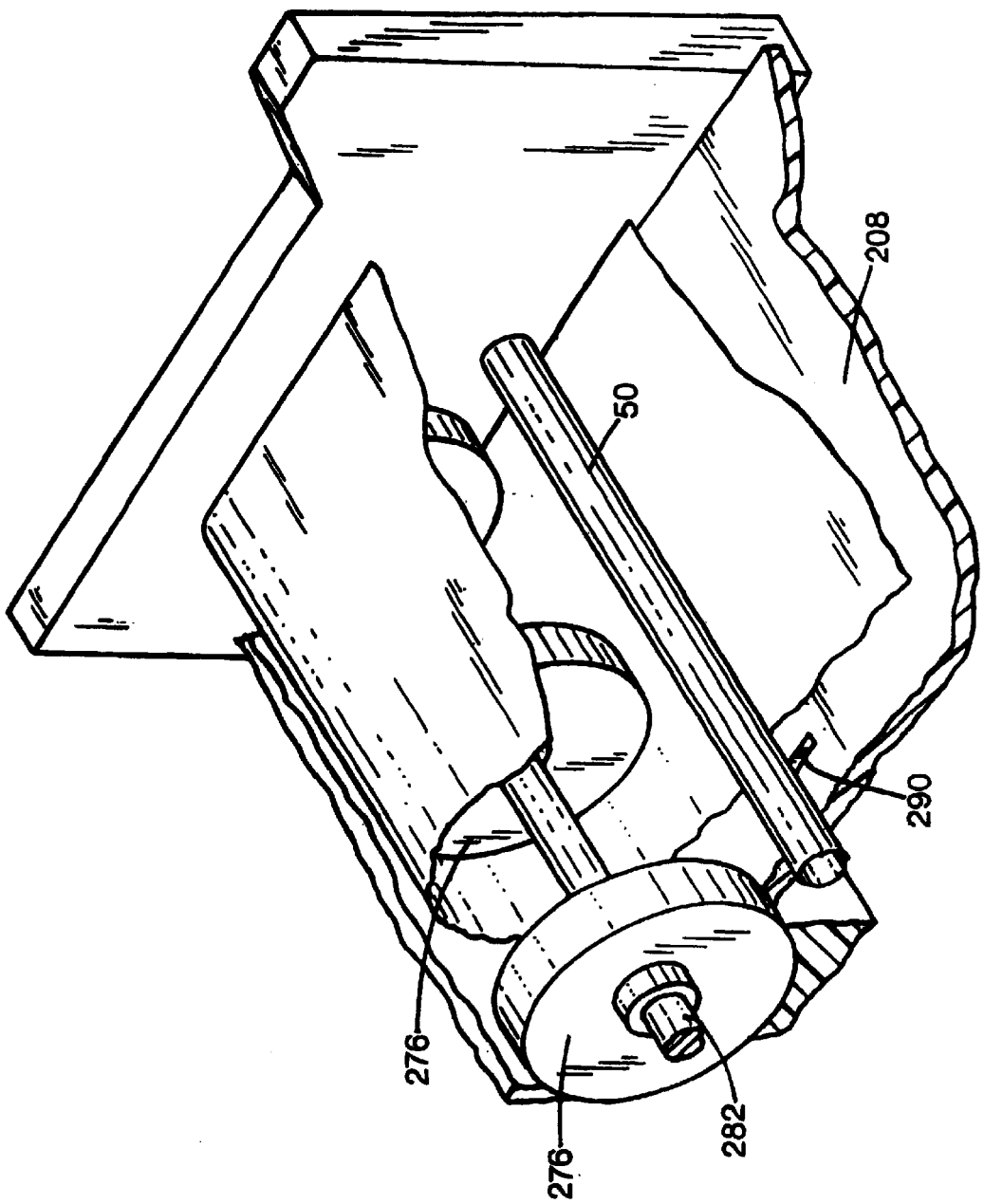
FIG. 9 is a front perspective view of the print media handling system shown in FIG. 8.

A front, top perspective view of print media handing system 206 of printing device 200 is shown in FIG. 8. A stack of print media 274 is loaded in input supply feed tray 208 and aligned via sliding length adjustment lever 214 and sliding width adjustment lever 216. Print media feed rollers 276, only one of which is shown, are designed to select a single sheet of print media from stack 274 and transport the sheet to print zone 205 for printing. Print media feed rollers 276 are mounted on a shaft 282 (see FIG. 9) which is driven by a motor (not shown). This motor is controlled by printer controller 220.

A user may desire to produce a variety of different printed outputs with printing device 200. For example, a user may want to produce letters, envelopes, glossy-finish photographs, overhead transparencies, etc. Each of these printed outputs resides on a different print medium, which can be of different sizes. To detect the size of the print medium in the input tray 212, a detector system 50 as illustrated in FIG. 1 is employed. The tube 52 is positioned to detect the lateral width dimension of the print medium, and so is positioned transversely across the input supply feed tray 208 so that, as the print media is loaded into the tray, either in single sheet form or in a stack of print media, the flags (not shown in FIG. 8) are deflected according to the size of the media. A plurality of slots (e.g. slot 290 in FIG. 9) are formed in the tray 208 beneath the flags, to allow the flags to drop below the tray surface to the undeflected position when not blocked by the print medium.

A detector system in accordance with the invention can detect the length and width of the print medium. This can be accomplished by positioning two tubes in orthogonal directions, so that one tube detects the length of the print medium, and the other detects the width of the print medium.

Figure 10:
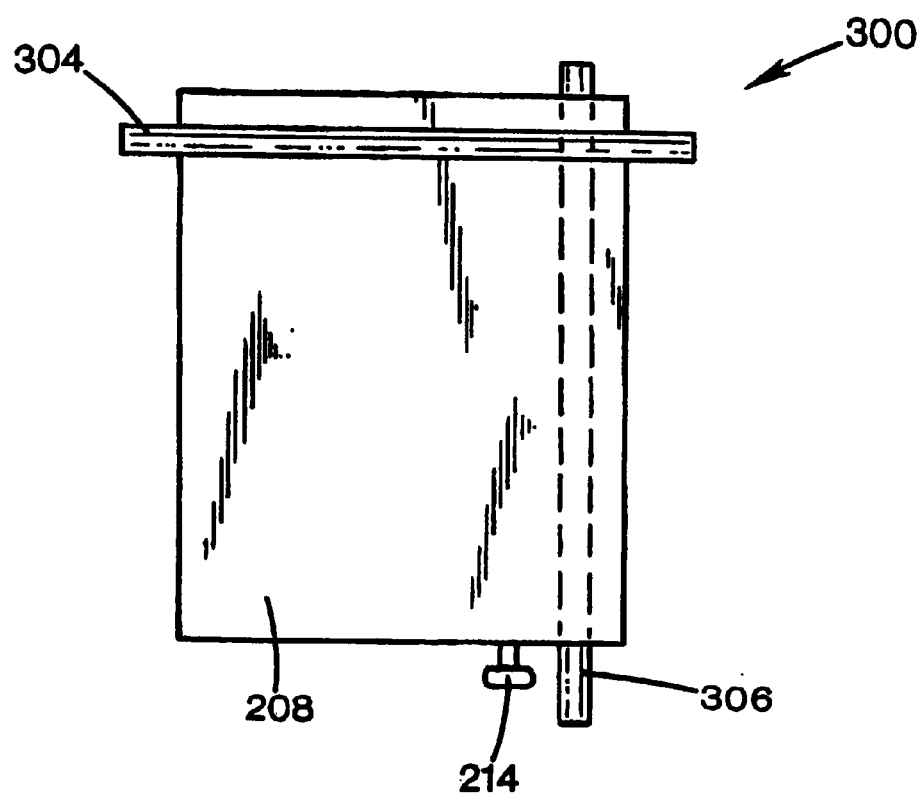
FIG. 10 is a simplified top view of a portion of a system in accordance with the invention for detecting print media size in two dimensions.

This two dimensional detector system is illustrated in schematic form in FIG. 10, where the system 300 includes a print media width detection tube 304, a length detection tube 306, both positioned in relation to the input media tray 208. FIG. 10 is a highly simplified top view, looking down at the tray 208. The tube 304 is positioned above the tray 208, and employs the multiple flag arrangement depicted in FIG. 1. The tube 306 is positioned below the tray 208, and employs the single flag arrangement shown in FIG. 4, with the single flag coupled by a link (not shown in FIG. 10) to the sliding length adjustment lever 214. Each tube has its own transducer arrangement (not shown in FIG. 10). By performing separate measurements using the respective tubes 304, 306, the length and width of the print medium loaded into the tray 208 can be determined.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A detection system for detecting the size of a print medium, comprising:
   a chamber containing a blocking flag at a location indicative of a print medium size;
   a transducer for launching an energy pulse into the chamber;
   a detector for detecting a resulting echo pulse to determine a size of the print medium.

2. The system of claim 1, further comprising a controller coupled to the transducer apparatus and to the detector to determine a print medium size.

3. The system of claim 2 wherein the controller is adapted to determine the print medium size from a measurement of a time interval between launching a pulse into the chamber and the arrival of the echo pulse at the detector.

4. The system of claim 1 wherein the transducer and the detector are provided by a single transducer element which performs both the function of launching said pulse and detecting said echo pulse.

5. The system of claim 1 further comprising a flag positioning apparatus for positioning said blocking flag, said flag positioning apparatus including a plurality of flag elements spaced along said chamber, each flag positioned for movement between a respective first position within said chamber and transverse to a longitudinal extent of the chamber, and a respective second position wherein the flag is not positioned within the chamber, and wherein the plurality of flags are respectively deflectable between the first and second positions in dependence on the print medium size.

6. The system of claim 5 wherein said chamber has formed therein a plurality of slits transverse to the longitudinal extent, and each of the plurality of flags is mounted for pivotal movement about a respective pivot point and has a flag portion which is positioned through a respective slit into the chamber when the flag is in the first position, and wherein the flag portion is pivoted out of the chamber slit when the flag is in the second position.

7. The system of claim 6 wherein said chamber is positioned adjacent said print medium, so that said print medium comes into contact with one or more of the flags, said contact deflecting said one or more flags about the respective pivot points to move the contacted flags from said first position to said second position.

8. The system of claim 1 wherein said print medium is held in a media tray which is size adjustable in dependence on a size of the print medium, the media tray comprising a movable structural feature which is moved in dependence on the print medium size, and wherein said flag is movable along a longitudinal extent of the chamber in dependence on the position of said movable structural feature to lengthen or shorten the distance between the flag and the transducer.

9. The system of claim 8 wherein said flag is mechanically coupled to the movable structural feature so that the flag moves in cooperation with the movable structural feature.

10. The system of claim 1 wherein the chamber is defined by a hollow tube.

11. The system of claim 1 further including a drive signal generator coupled to the transducer for generating pulses of electrical drive signals in an ultrasonic frequency range.

12. The system of claim 11 wherein said ultrasonic frequency range is between 40 Khz and 200 Khz.

13. The system of claim 11 wherein said transducer includes a piezoelectric transducer member.

14. An inkjet printer, comprising:
    a housing structure;
    an input tray for holding a supply of input print media in sheet form;
    an inkjet printing apparatus positioned at a print zone for ejecting droplets of ink onto a print medium;
    apparatus for advancing a sheet of print media from the stack to the print zone; and
    a detention system for detecting the size of a print medium in the stack, comprising:
        a chamber containing a blocking flag at a location indicative of a print medium size;
        a transducer for launching an energy pulse into the chamber;
        a detector for detecting a resulting echo pulse to determine a size of the print medium.

15. The printer of claim 14 wherein an elongated extent of the chamber extends along a lateral dimension of the print medium.

16. The printer of claim 14 wherein an elongated extent of the chamber extends along a longitudinal dimension of the print medium.

17. A method for detecting the size of a print medium, comprising the steps of:
    positioning a blocking flag in a chamber at a location indicative of a print medium size;
    launching an energy pulse into the chamber;
    detecting a resulting echo pulse to determine a size of the print medium.

18. The method of claim 17 wherein said step of detecting a resulting echo pulse to determine a size of the print medium includes:
    determining the time between the launching of the one or more pulses and the receipt of corresponding echoes of said one or more pulses at a transducer apparatus; and
    determining the print medium size in dependence on said time.

19. The method of claim 14 wherein the step of positioning a blocking flag in a chamber includes positioning the flag in a hollow tube adjacent the print medium.

* * * * *